United States Patent
Okada et al.

(10) Patent No.: US 9,628,665 B2
(45) Date of Patent: Apr. 18, 2017

(54) INFORMATION PROCESSING SYSTEM, INFORMATION PROCESSING APPARATUS, INFORMATION PROCESSING METHOD, AND RECORDING MEDIUM

(71) Applicants: Daisuke Okada, Saitama (JP); Hiroya Uruta, Tokyo (JP); Yuka Saito, Tokyo (JP); Akiko Kitayama, Kanagawa (JP); Yuto Shibata, Kanagawa (JP); Chan Gu, Tokyo (JP); Keisuke Nakazawa, Kanagawa (JP)

(72) Inventors: Daisuke Okada, Saitama (JP); Hiroya Uruta, Tokyo (JP); Yuka Saito, Tokyo (JP); Akiko Kitayama, Kanagawa (JP); Yuto Shibata, Kanagawa (JP); Chan Gu, Tokyo (JP); Keisuke Nakazawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/942,234

(22) Filed: Nov. 16, 2015

(65) Prior Publication Data

US 2016/0150123 A1 May 26, 2016

(30) Foreign Application Priority Data

Nov. 21, 2014 (JP) ................. 2014-236385

(51) Int. Cl.
*H04N 1/04* (2006.01)
*H04N 1/32* (2006.01)
(Continued)

(52) U.S. Cl.
CPC ......... *H04N 1/32368* (2013.01); *G06Q 10/00* (2013.01); *H04N 1/00477* (2013.01);
(Continued)

(58) Field of Classification Search
CPC .......... H04N 1/32368; H04N 1/00477; H04N 2201/0013; H04N 2201/0093
(Continued)

(56) References Cited

U.S. PATENT DOCUMENTS

2009/0083439 A1 3/2009 Matsuda
2010/0332024 A1 12/2010 Ochi
(Continued)

FOREIGN PATENT DOCUMENTS

JP 2010-038998 2/2010

OTHER PUBLICATIONS

Extended European Search Report dated Mar. 29, 2016 issued in corresponding European Application No. 15195050.8.

*Primary Examiner* — Houshang Safaipour
(74) *Attorney, Agent, or Firm* — Harness, Dickey & Pierce, P.L.C.

(57) ABSTRACT

An information processing system includes a first information processing apparatus and a second information processing apparatus. The first information processing apparatus includes an acquisition part creating a first information request, a first transmitter transmitting the first information request to the second information processing apparatus, a first receiver receiving the first information from the second information processing apparatus, a display controller controlling displaying the first information, and a first storage storing second information, the display controller controlling displaying the second information when the second information is stored in the first storage. The second information processing apparatus includes a second storage storing the first information, a second receiver receiving the first information request, an extracting part extracting the first information from the second storage in response to the first information request, and a second transmitter transmitting
(Continued)

the first information to the first information processing apparatus.

20 Claims, 12 Drawing Sheets

(51) Int. Cl.
*G06Q 10/00* (2012.01)
*H04N 1/00* (2006.01)

(52) U.S. Cl.
CPC ............... *H04N 2201/0013* (2013.01); *H04N 2201/0093* (2013.01)

(58) Field of Classification Search
USPC ........................................ 358/1.15, 440, 474
See application file for complete search history.

(56) References Cited

U.S. PATENT DOCUMENTS

| | | |
|---|---|---|
| 2012/0154842 A1 | 6/2012 | Hori |
| 2014/0198342 A1 | 7/2014 | Nakabayashi et al. |
| 2016/0014281 A1* | 1/2016 | Ichiyama ............ H04N 1/00127 358/1.15 |

* cited by examiner

FIG.4

| ADDRESS IDENTIFICATION INFORMATION | DISPLAY NAME | MAIL ADDRESS | FACSIMILE NUMBER | CIRCUIT SELECTION INFORMATION | GENERATION INFORMATION |
|---|---|---|---|---|---|
| 001 | AAA | A@aaa.com | 111-222-333 | G3 | Ver.1.2 |
| 002 | BBB | B@bbb.com | 444-555-666 | G4 | Ver.1.3 |
| 003 | CCC | C@ccc.com | 777-888-999 | G3 | Ver.1.2 |
| ... | ... | ... | ... | ... | ... |

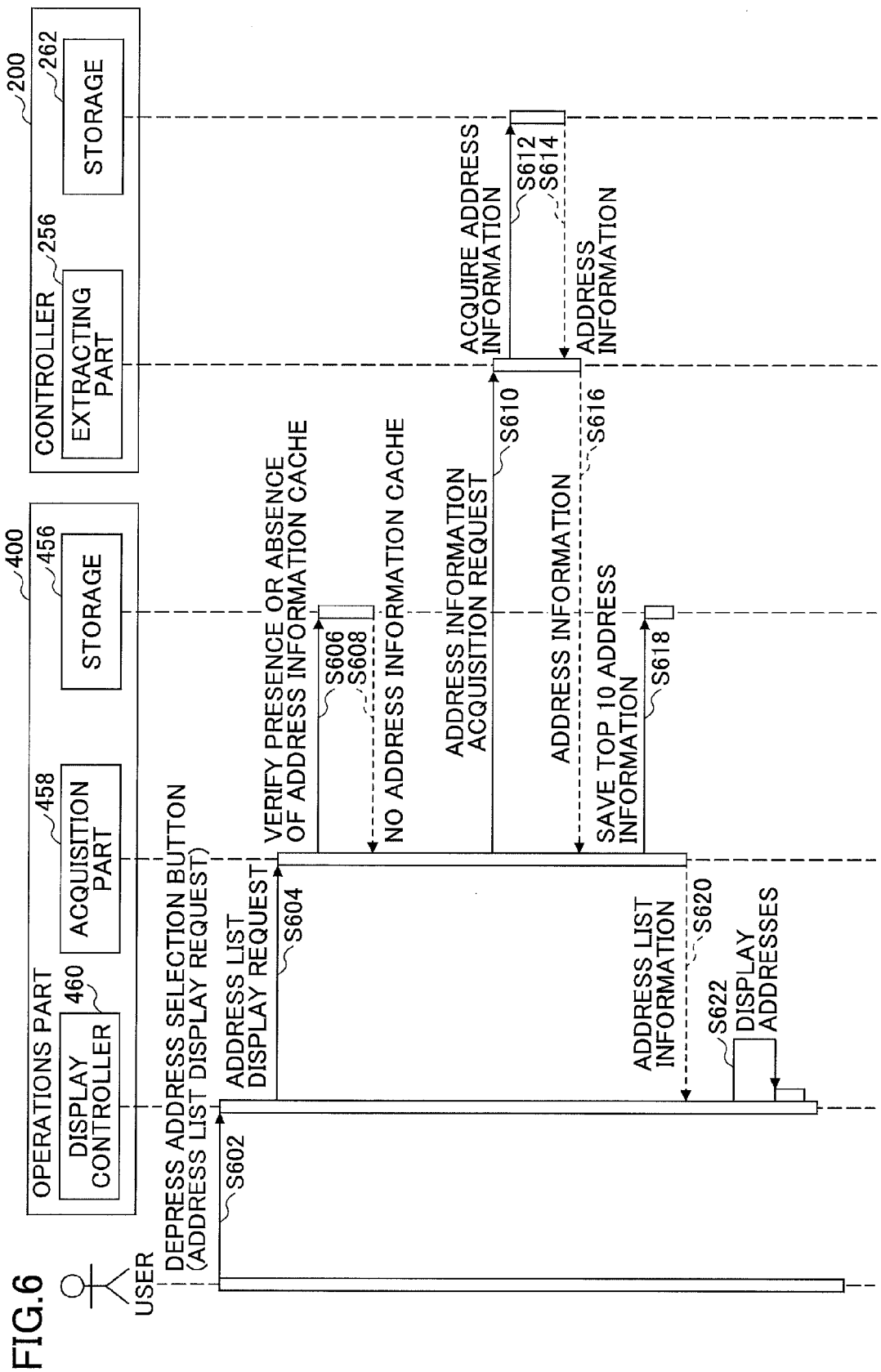

INFORMATION PROCESSING SYSTEM, INFORMATION PROCESSING APPARATUS, INFORMATION PROCESSING METHOD, AND RECORDING MEDIUM

BACKGROUND OF THE INVENTION

1. Field of the Invention

The disclosures discussed herein relate to an information processing system.

2. Description of the Related Art

There are image forming apparatuses having a main body controller (a main controller) and an operations part in the art (e.g., see Japanese Unexamined Patent Application Publication No. 2010-38998, Patent Document 1). The controller is configured to control an image forming apparatus main body. The operations part is provided with a controller and a storage, and may be activated independently. With such a configuration, the user may be able to browse on a screen display of the operations part to operate the operations part without coupling the operations part and the controller.

Further, some of the image forming apparatuses are provided with a function to transmit data scanned by a scanner or facsimile data via a facsimile machine to an address selected from an address book.

RELATED ART DOCUMENT

Patent Document

Patent Document 1: Japanese Unexamined Patent Application Publication No. 2010-38998

SUMMARY OF THE INVENTION

Accordingly, it is a general object in one embodiment of the present invention to provide an information processing system having a first information processing apparatus such as an operations part, and a second information processing apparatus such as a controller (a main controller) capable of reducing a time until the first information processing apparatus can display information stored in the second information processing apparatus that substantially obviates one or more problems caused by the limitations and disadvantages of the related art.

According to an aspect of embodiments, there is provided an information processing system that includes a first information processing apparatus configured to receive operations; and a second information processing apparatus configured to perform operations based on a request from the first information processing apparatus. The first information processing apparatus includes an acquisition part configured to create a first information request for acquiring first information stored by the second information processing apparatus, a first transmitter configured to transmit the first information request to the second information processing apparatus, a first receiver configured to receive the first information transmitted by the second information processing apparatus, a display controller configured to control a display process of displaying the first information, and a first storage configured to store second information, the second information being a part of the first information, the acquisition part storing the second information in the first storage, the display controller controlling a display process of displaying the second information when the second information is stored in the first storage. The second information processing apparatus includes a second storage configured to store the first information, a second receiver configured to receive the first information request transmitted by the first information processing apparatus, an extracting part configured to extract the first information from the second storage in response to the first information request, and a second transmitter configured to transmit the first information to the first information processing apparatus.

Other objects, features and advantages of the present invention will become more apparent from the following detailed description when read in conjunction with the accompanying drawings.

BRIEF DESCRIPTION OF THE DRAWINGS

FIG. 4 is a diagram illustrating an example of an address book;

FIG. 6 is a sequence diagram illustrating operations of an image processing apparatus according to an embodiment;

DETAILED DESCRIPTION OF THE PREFERRED EMBODIMENTS

Figure 1:
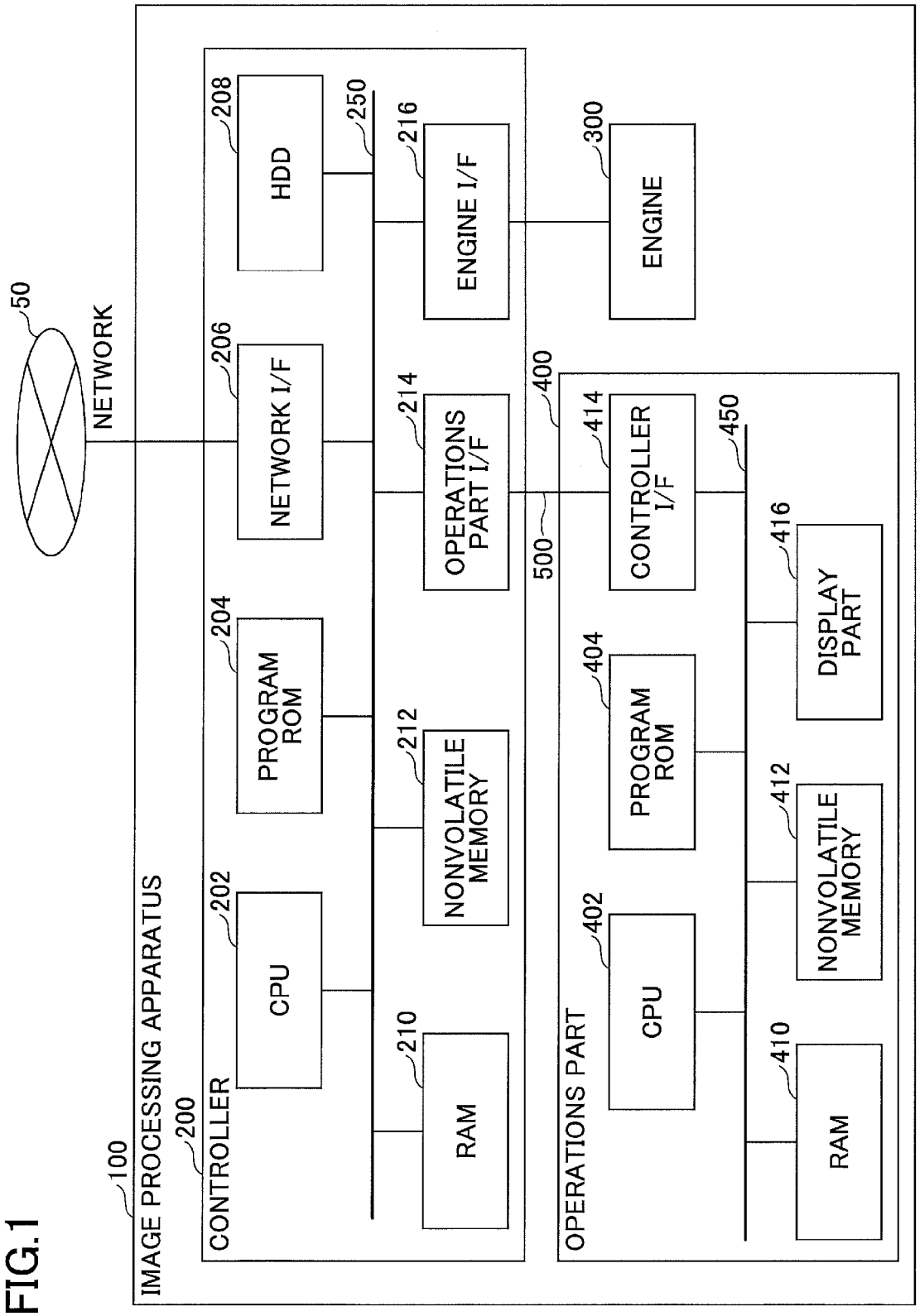
FIG. 1 is a diagram illustrating a hardware configuration example of an image processing apparatus according to an embodiment.

Next, a description is given of embodiments of the present invention with reference to the accompanying drawings. The following embodiments are only examples, and therefore embodiments are not limited to these examples. Note that in the drawings, components having the same functions are provided with the same reference numbers, and a duplicated description is omitted from the specification.

First Embodiment

Image Processing Apparatus

FIG. 1 is a diagram illustrating a hardware configuration example of an image processing apparatus 100 according to an embodiment.

The image processing apparatus 100 includes a controller 200 configured to serve as a main controller to perform apparatus status management or job control; an engine 300 configured to execute functions such as a printer function, a facsimile transmission function, a scanner function, and a copier function; a CPU (central processing unit) or a storage area independent of the controller 200; and an operations part 400 configured to perform control such as a screen display control to provide a user interface. The controller 200 is coupled to the operations part 400 via a wired interface such as a cable 500.

In the image processing apparatus 100 according to the first embodiment, OS (operating system) software of the controller 200 side differs from OS software of the operations part 200 side in order to maintain functional independencies. That is, the controller 200 and the operations part 400 operate independently from each other in separate operating systems. For example, Linux (Registered Trademark) may be used as the OS software of the controller 200 side, and Android (Registered Trademark) may be used as the OS software of the operations part 400 side. A USB (universal serial bus) may be coupled between the controller 200 and the operations part 400 to perform communications between the controller 200 and the operations part 400.

In the image processing apparatus 100 according to the first embodiment, the controller 200 and the operations part 400 operate in separate operating systems. Hence, communications between the controller 200 and the operations part 400 are not performed as communications within a common apparatus, but are performed as communications between the different apparatuses. Examples of the above-described operations include operations (command communications) to propagate information (instruction contents from a user) received by the operations part 400 to the controller 200, and operations of the controller 200 to report an event to the operations part 400. The operations part 400 may be able to use functions of the controller 200 by performing command communications with the controller 200. Further, examples of the information contents reporting from the controller 200 to the operations part 400 include operation execution statuses in the controller 200, and setting contents in the controller 200.

The controller 200 includes a CPU 202, a program ROM (read only memory) 204, a network I/F (interface) 206, an HDD (hard disk drive) 208, a RAM (random access memory) 210, a nonvolatile memory 212, an operations part I/F 214, and an engine I/F 216.

The CPU 202 is configured to perform main control operations such as power source management and job control in the controller 200. The program ROM 204 is configured to store controller programs relating to control operations of the controller 200. The network I/F 206 is configured to perform communications between the controller 200 and an external network 50. The HDD 208 is configured to store a relatively large amount of data (information) such as address books. The RAM 210 is a program execution storage area, and used during processing of print images. The nonvolatile memory 212 is used for storing document data or data required for processing images. The operations part I/F 214 is configured to perform communications between the controller 200 and the operations part 400. The engine I/F 216 is configured to perform communications between the controller 200 and the engine 300.

The operations part 400 includes a CPU 402, a program ROM 404, a controller I/F 414, a RAM 410, a nonvolatile memory 412, and a display part 416.

The CPU 402 is configured to perform main control operations such as processes relating to operations conducted in the operations part 400. The program ROM 404 is configured to store operations programs relating to control operations of the operations part 400. The controller I/F 414 is configured to perform communications between the operations part 400 and the controller 200. The RAM 410 is used as a program execution storage area. The nonvolatile memory 412 is configured to cache the address information transmitted from the controller 200 and save initial values of various setting values, or settable items that are used for activating the controller 200. The display part 416 is composed of an electronic component that combines a display apparatus (e.g., a liquid crystal panel), and a position input apparatus (e.g., a touch panel).

Figure 2:
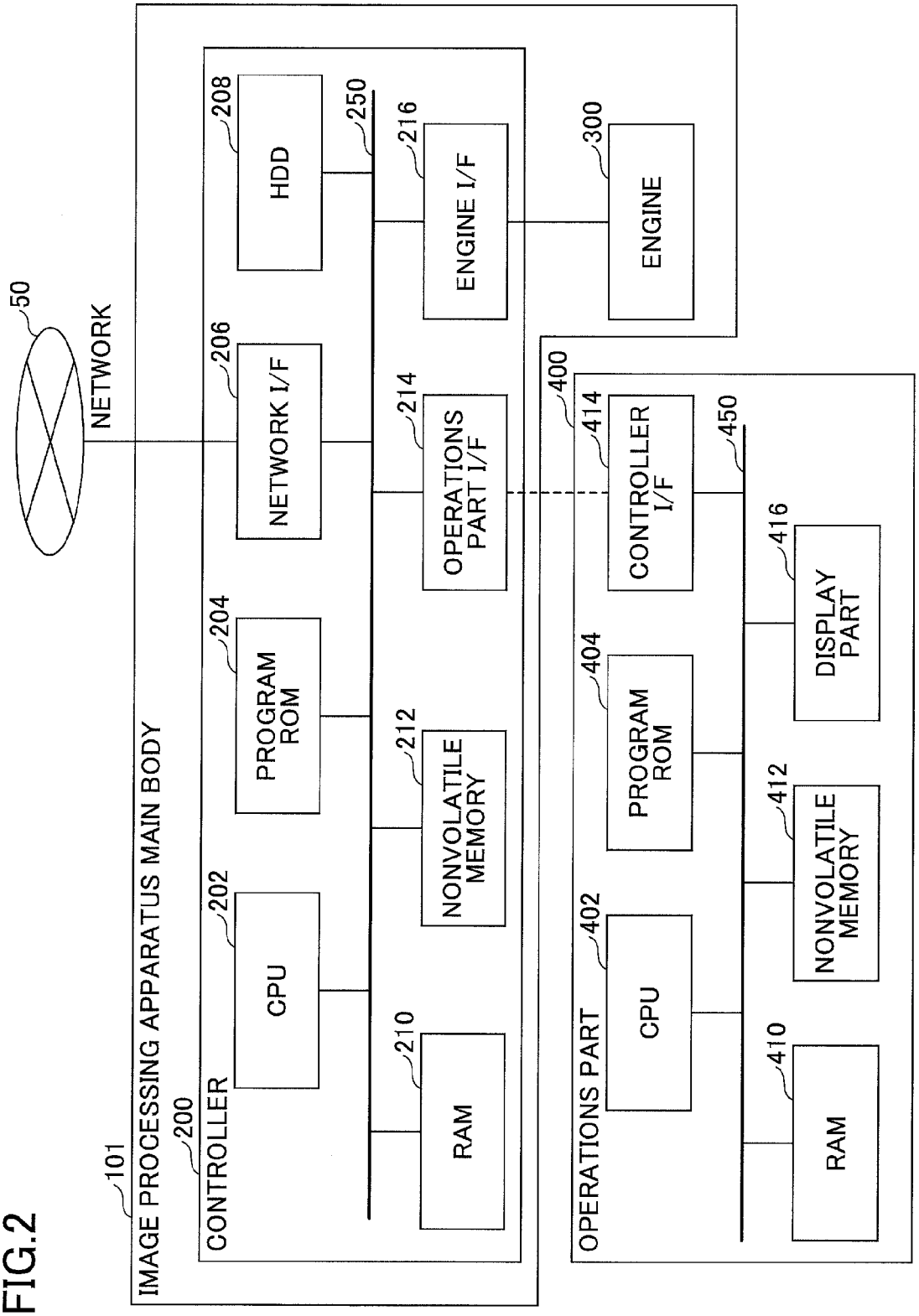
FIG. 2 is a diagram illustrating a hardware configuration example of an image processing apparatus according to an embodiment.

FIG. 2 is a diagram illustrating another hardware configuration of the image processing apparatus 100. In the image processing apparatus 100 illustrated in FIG. 1, the operations part 400 and the controller 200 are coupled by cable such that the controller 200, the engine 300, and the operations part 400 are integrated as the image processing apparatus 100. In the example of FIG. 2, the operations part I/F 214 of the controller 200 and the controller I/F 414 are wirelessly coupled. That is, an image processing apparatus main body 101 including the controller 200 and the engine 300, and the operations part 400 are separately constructed.

Hence, the operations part 400 may be accessed or used regardless of the location of the operations part 400 by wirelessly coupling between the operations part 400 and the image processing apparatus main body 101. The operations part 400 is configured to directly receive an activation request from a user, and operate independently of the controller 200. The screen control of the operations part 400, and the coupling process between the operations part 400 and the controller 200 are asynchronously processed in parallel, and hence, the user may be able to operate a screen without being affected by the status of the controller 200.

Note that the operations part 400 may be configured as an information processing terminal such as a smartphone or a tablet terminal so as to execute information processing independently. That is, instead of coupling to the controller 200 an operations panel, which is installed as a dedicated operations part of the image processing apparatus 100, the operations part 400 is coupled to the controller 200. Each of the operations part 400 and the controller 200 may be detected as an individual apparatus. In such a case, the image processing apparatus 100 is an example of an apparatus in which the operations part 400 is installed. However, the operations part 400 is not limited to being installed in the image processing apparatus 100, and may be installed in any apparatuses such as a computer or an information processing apparatus that executes programs. For example, a projector, a TV-conference system, and a digital-still camera may be used instead of the image processing apparatus 100.

Functional Configurations of First Embodiment

Figure 3:
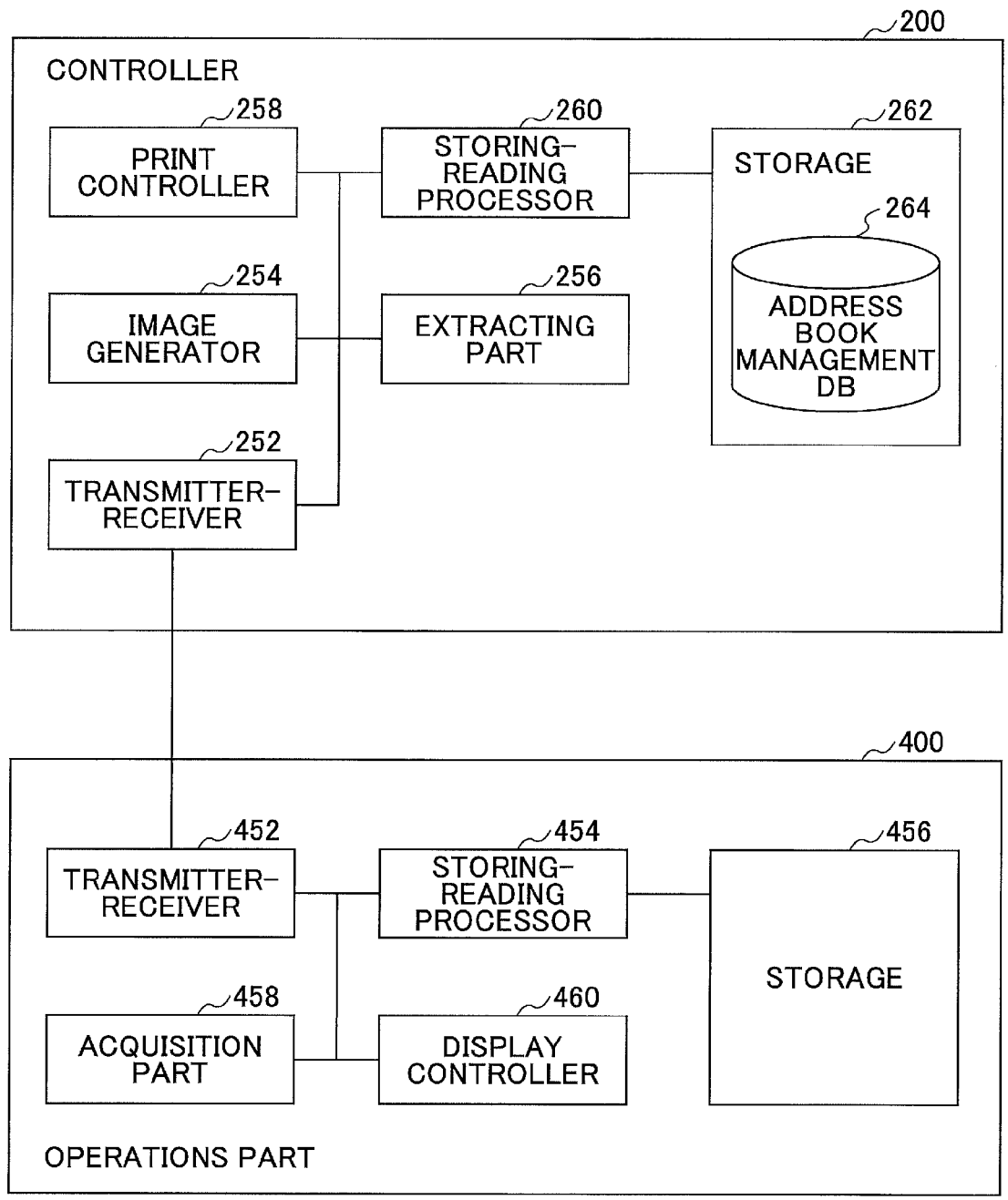
FIG. 3 is a functional block diagram illustrating an image processing apparatus according an embodiment.

Next, a description is given of functional configurations of the first embodiment. FIG. 3 is a functional block diagram illustrating a controller 200 and an operations part 400 that form the image processing apparatus 100 of the first embodiment. In FIG. 3, the controller 200 and the operations part 400 are coupled such that the controller 200 and the operations part 400 perform data communications via USB communications, as illustrated in the image processing apparatus 100 of FIG. 1. Further, the controller 200 and the operations part 400 may be wirelessly coupled in a manner similar to the image processing apparatus 100 illustrated in FIG. 2.

Functional Configuration of Controller 200

The controller 200 includes a transmitter-receiver 252, an image generator 254, an extracting part 256, a print controller 258, and a storing-reading processor 260. These components are functional components or functional parts implemented by causing any one of the components illustrated in FIG. 1 to operate based on instructions from the CPU 202 in accordance with the controller programs stored in the program ROM 204. Further, the controller 200 includes a storage 262 formed of the HDD 208 illustrated in FIG. 1.

Address Book Management Table

The storage 262 includes an address book management DB 264 composed of an address book such as an address book illustrated in FIG. 4. The address book may, for example, include address identification information, a display name, a mail address, a FAX number, circuit selection information, and generation information in association with a corresponding one of addresses. Note that each address in association with the address identification information, the display name, the mail address, the FAX number, the circuit selection information, and the generation information is defined as address information or an address information item. The address book includes one or more address information items. However, not all the address, the address identification information, the display name, the mail address, the FAX number, the circuit selection information, and the generation information are included in the address information. The circuit selection information indicates standard information of facsimile machines such as G3 or G4. The generation information indicates identification information for identifying update information of each address. For example, in the address book illustrated in FIG. 4, address information having address identification information "001" has a display name "AAA", a mail address "A@aaa.com", a FAX number "111-222-333", circuit selection information "G3", and generation information "Ver. 1.2".

Functional Configuration of Controller 200

Next, an illustration is given of details of components of the controller 200.

The transmitter-receiver 252 of the controller 200 is implemented by the operations part I/F 214 illustrated in FIG. 1, and is configured to transmit to or receive from the operations part 400 various types of data (information) via USB communications.

The image generator 254 of the controller 200 is implemented by instructions from the CPU 202, the controller program stored in the program ROM 204, and the RAM 210 illustrated in FIG. 1, and is configured to process user job data to form image data in the RAM 210.

The storing-reading processor 260 of the controller 200 is implemented by instructions from the CPU 202, the controller programs stored in the program ROM 204, and the HDD 208 illustrated in FIG. 1. The storing-reading processor 260 is further configured to store various types of data in the storage 262, and read various types of data stored in the storage 262.

The print controller 258 of the controller 200 is implemented by instructions from the CPU 202, the controller programs stored in the program ROM 204, and the engine I/F 216 illustrated in FIG. 1. The print controller 258 is configured to control the engine 300 to cause the image generator 254 to transfer the image data in the RAM 210 to a sheet of paper, that is, print the image on the sheet of paper.

The extracting part 256 of the controller 200 is implemented by instructions from the CPU 202, the controller programs stored in the program ROM 204, and the operations part I/F 214 illustrated in FIG. 1. The extracting part 256 is configured to extract address information from the address book stored in the address book management DB 264 of the storage 262, and cause the transmitter-receiver 252 to transmit the extracted address information to the operations part 400 in accordance with the address information acquisition request transmitted by the operations part 400. Note that the address information acquisition request indicates a request for acquiring one or more address information items from the address book of the address book management DB 264 stored in the storage 262 of the controller 200. For example, the address information acquisition request is provided with address information items acquired by the operations part 400 among the address information items included in the address book. The address information to be acquired specifies the number of address information items, or a range of the address information in the address book. The range of the address information may be specified by address identification information. Specifically, the number of address information items may be specified by a numerical value such as several to several tens, and the range may be specified by range information such as address identification information "001" to "010". In this case, the extracting part 256 may extract a part of the address information from the two or more address information items included in the address book stored in the address book management DB 264 of the storage 262, and cause the transmitter-receiver 252 to transmit the extracted address information to the operations part 400 in accordance with the address information attached to the address information acquisition request. Note also that the address information items may be specified as the address information to be acquired.

Functional Configuration of Operations Part 400

The operations part 400 includes a transmitter-receiver 452, a storing-reading processor 454, an acquisition part 458, and a display controller 460. These components are functional components or functional parts implemented by causing any one of the components illustrated in FIG. 1 to operate based on instructions from the CPU 402 in accordance with the operations part programs stored in the program ROM 404. Further, the operations part 400 includes a storage 456 formed of the nonvolatile memory 412 illustrated in FIG. 1.

Detailed Functional Configuration of Operations Part 400

Next, an illustration is given of details of components of the operations part 400.

The transmitter-receiver 452 of the operations part 400 is implemented by the controller I/F 414 illustrated in FIG. 1, and is configured to transmit to or receive from the controller 200 various types of data (information) via USB communications.

The storing-reading processor 454 of the display apparatus 400 is implemented by instructions from the CPU 402 illustrated in FIG. 1. The storing-reading processor 454 is further configured to store various types of data in the storage 456, and read various types of data stored in the storage 456.

The display controller 460 of the operations part 400 is implemented by instructions from the CPU 402 illustrated in FIG. 1 or operations part programs stored in the program ROM 404, and is configured to control an image display process for displaying an image on the display part 416. Further, the display controller 460 inputs into the acquisition part 458 operational information created by the user's depress operation to form a display on the screen of the display part 416. For example, the display controller 460 inputs into the acquisition part 458 the address list display request created by the user's operation to request displaying a list of the address information. The display controller 460 displays the address information on the display part 416 when the address information is input as a response to the address list display request from the acquisition part 458.

The acquisition part 458 of the operations part 400 is implemented by instructions from the CPU 402 illustrated in FIG. 1 or operations part programs stored in the program ROM 404. The acquisition part 458 determines whether the address information is stored in the storage 456 when the address list request is input by the display controller 460. Specifically, when the address list request is input by the display controller 460, the acquisition part 458 causes the storing-reading processor 454 to read the address information stored in the storage 456. The acquisition part 458 determines that the address information is stored in the storage 456 when the acquisition part 458 is able to read the address information, and determines that the address information is not stored in the storage 456 when the acquisition part 458 fails to read the address information. When the address information is stored in the storage 456, the acquisition part 458 acquires the stored address information, and inputs the acquired address information as well as creating the address information acquisition request. This address information acquisition request specifies the number of address information items or a range of the address information in the address book as address information to be acquired. The acquisition part 458 causes the transmitter-receiver 452 to transmit the address information acquisition request to the controller 200.

On the other hand, when the address information is not stored in the storage 456, the acquisition part 458 creates an address information acquisition request. The address information acquisition request specifies the address information as address information of the addresses to be acquired. The acquisition part 458 causes the transmitter-receiver 452 to transmit the address information acquisition request to the controller 200.

When the address information transmitted by the controller 200 is input from the transmitter-receiver 452 as a response to the address information acquisition request, and when the address information is not stored in the storage 456, the acquisition part 458 stores a part of the address information input from the transmitter-receiver 452 into the storage 456. Further, the acquisition part 452 inputs the address information input from the transmitter-receiver 452 into the display controller 460. For example, when the address information is not stored in the storage 456, the acquisition part 458 stores into the storage 456 ten address information items from the top that are input from the transmitter-receiver 452. On the other hand, when the address information is stored in the storage 456, the address information input from the transmitter-receiver 452 is input into the display controller 460.

The display controller 460 is configured to display the address information input by the acquisition part 458 on the display part 416.

Moreover, the programs (the controller programs, or the operations programs) executed by the image processing apparatus 100 according to the above-described embodiment may be configured in an installable file format or in an executable file format and recorded in a computer-readable recording medium such as a CD-ROM, a flexible disk (FD), a CD-R, a DVD (digital versatile disk), a USB (universal serial bus), or may be provided or distributed via a network such as the Internet. Moreover, various types of programs may be incorporated in advance in a nonvolatile recording medium such as a ROM or the like.

Operations of Image Processing Apparatus 100

Figure 5:
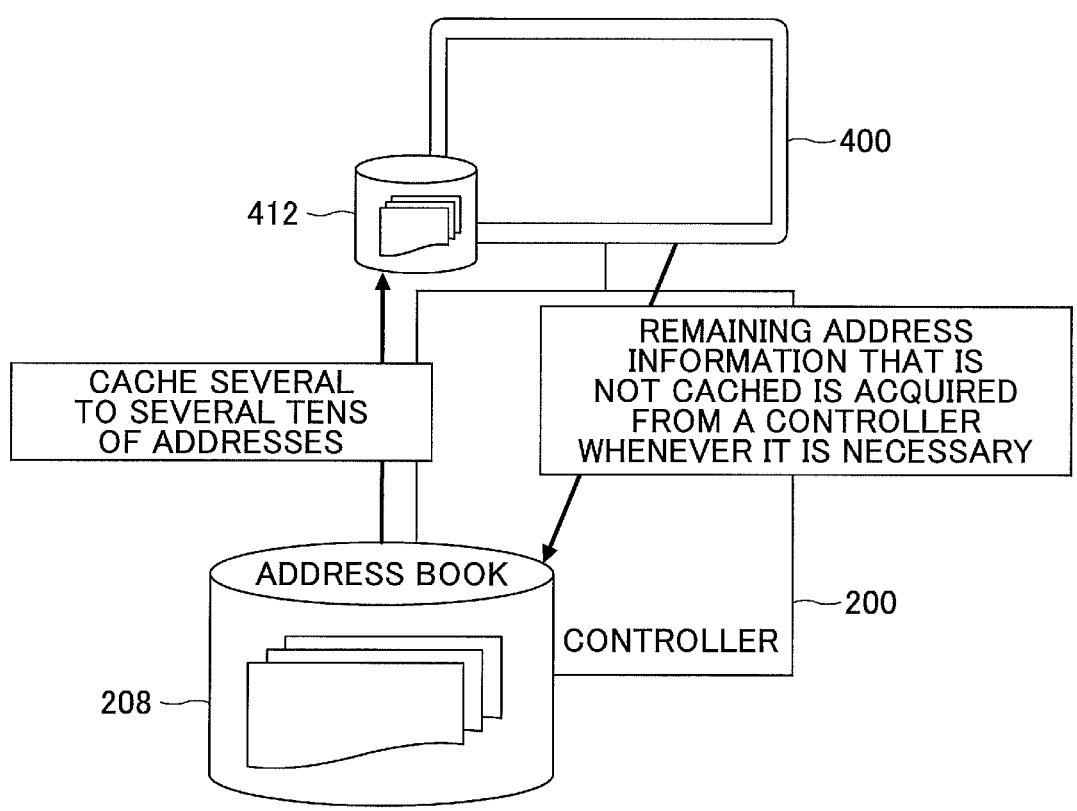
FIG. 5 is a diagram illustrating an overview of operations of an image processing apparatus according to the embodiment.

FIG. 5 is an outline diagram illustrating operations of an image processing apparatus 100 according to the embodiment.

In the image processing apparatus 100 according to the embodiment, some (several to several tens address information items) of address information items included in the address book stored in the controller 200 are cached in the nonvolatile memory 412 of the operations part 400. When the user operates the operations part 400 to request displaying a list of the address information, the address information items cached in the nonvolatile memory 412 are displayed. The operations part 400 acquires the remaining address information from the controller 200 in the background while the address information cached in the nonvolatile memory 412 is displayed.

In the following, a detailed description of the operations of the image processing apparatus 100 according to the embodiment is given specifically of a screen displayed on the display part 416 of the operations part 400.

FIG. 6 is a sequence diagram illustrating operations of an image processing apparatus 100 according to the embodiment. FIG. 7 illustrates transition examples of a screen (user interface: UI) displayed on the display part 416 of the operations part 400.

FIG. 6 illustrates a operational process in a case where the address information is not cached in the operations part 400 when the user makes a request for displaying a list of the address information. When the address information is not cached in the operations part 400, the operations part 400 acquires the address information from the controller 200, and caches a part of all the acquired address information in the storage 456. The display part 16 displays a message "Please wait . . . " while the operations part 400 acquires the address information from the controller 200.

Figure 7A:
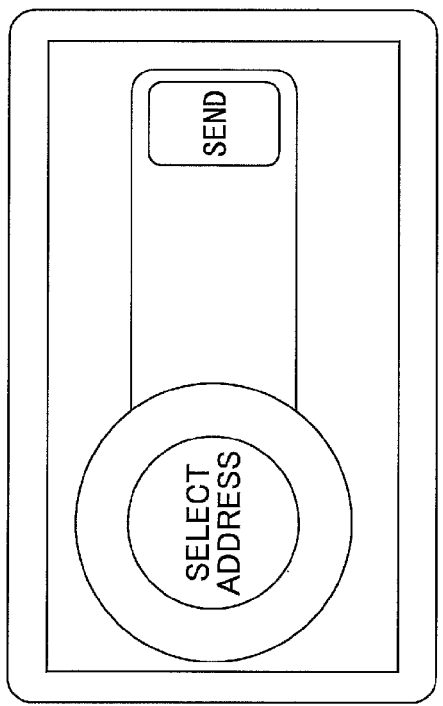
FIGS. 7A to 7D are diagrams illustrating examples of a screen displayed on an operations part of an image processing apparatus according an embodiment.
Figure 7B:
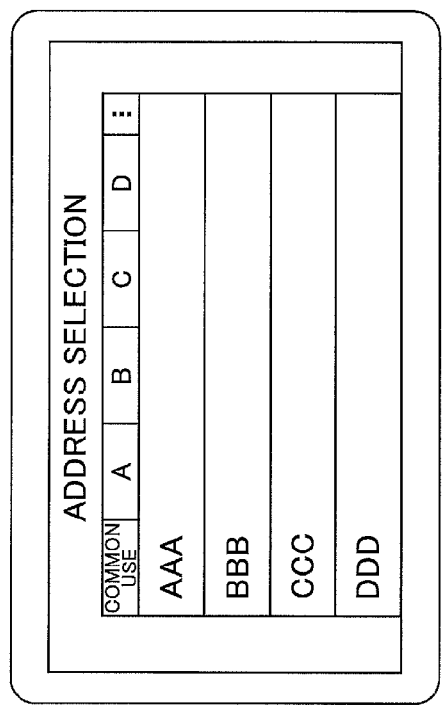

In step S602, the user operates a HOME screen displayed on the display part 416 of the operations part 400 to make a request for performing a process such as copying, transmitting facsimile, or scanning. In FIG. 7A illustrates an example of the HOME screen. The user may be able to select a desired one of application icons displayed on the HOME screen, and depress the selected icon to activate the desired application. When the application is activated, an address selection button "SELECT ADDRESS" is displayed on the display part 416 of the operations part 400. In addition, FIG. 7B illustrates an example of a screen displaying the address selection button. The user makes a request for displaying the list of address information by depressing the address selection button displayed on the display part 416 of the operations part 400. The display controller 460 of the operations part 400 creates an address list display request when receiving the request of displaying the list of the address information.

In step S604, the display controller 460 of the operations part 400 inputs the address list display request into the acquisition part 458.

In step S606, the acquisition part 458 of the operations part 400 causes the storing-reading processor 454 to verify whether the address information is cached in storage 456.

Figure 7C:
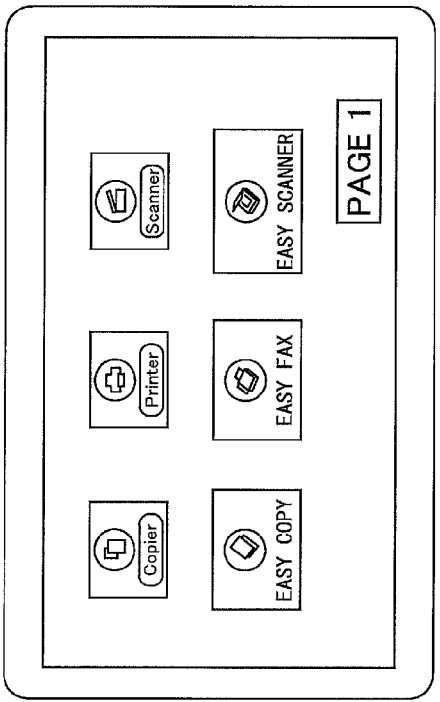

In step S608, since the address information is not cached in the storage part 456, the storing-reading processor 454 of the operations part 400 transmits to the acquisition part 458 a report indicating that the address information has not been cached. When the acquisition part 458 receives the report indicating that the address information has not been cached, the acquisition part 458 instructs the display controller 460 to display a message "Please wait . . . ". The display controller 460 displays a message "Please wait . . . " on the display part 416 in accordance with display instructions from the acquisition part 458. Further, FIG. 7C illustrates an example of a screen displayed in duration from a time at which the storing-reading processor 454 determines that the address information has not been cached in the storage 456 of the operations part 400 to a time at which the address information is displayed.

In step S610, the acquisition part 458 of the operations part 400 causes the transmitter-receiver 452 to transmit an address information acquisition request for acquiring the address information to the controller 200. The address information acquisition request specifies the address information as address information of the addresses to be acquired. The address information acquisition request transmitted by the operations part 400 is received by the transmitter-receiver 252 of the controller 200, and the received address information acquisition request is input into the extracting part 256.

In step S612, the extracting part 256 of the controller 200 requests the storing-reading processor 260 to acquire the address information items included in the address book stored in the address book management DB 264 of the storage 262 in accordance with the address information acquisition request from the operations part 400.

In step S614, the storing-reading processor 260 of the controller 200 inputs the address information items included in the address book stored in the address book management DB 264 of the storage 262 into the extracting part 256.

In step S616, the extracting part 256 of the controller 200 causes the transmitter-receiver 252 to transmit the address information items included in the address book input by the storing-reading processor 260 to the operations part 400. The address information items included in the address book transmitted by the controller 200 are received by the transmitter-receiver 452 of the operations part 400, and the received address information items are input into the acquisition part 458.

In step S618, the acquisition part 458 of the operations part 400 causes the storage 456 to store a part of the address information items of the address information items included in the address book transmitted by the controller 200. Specifically, the acquisition part 458 causes the storage 456 to store top ten address information items of the address information items included in the address book.

In step S620, the acquisition part 458 of the operations part 400 inputs the address information items included in the address book in the display controller 460.

Figure 7D:
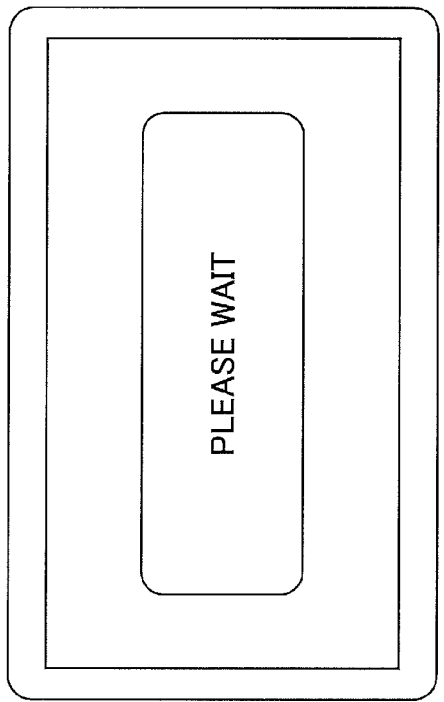

In step S622, the display controller 460 of the operations part 400 displays address information on the display controller 416. FIG. 7D illustrates an example of a display screen displaying a list of address information items. The user may be able to select an address by browsing the list of the address information items.

Figure 8:
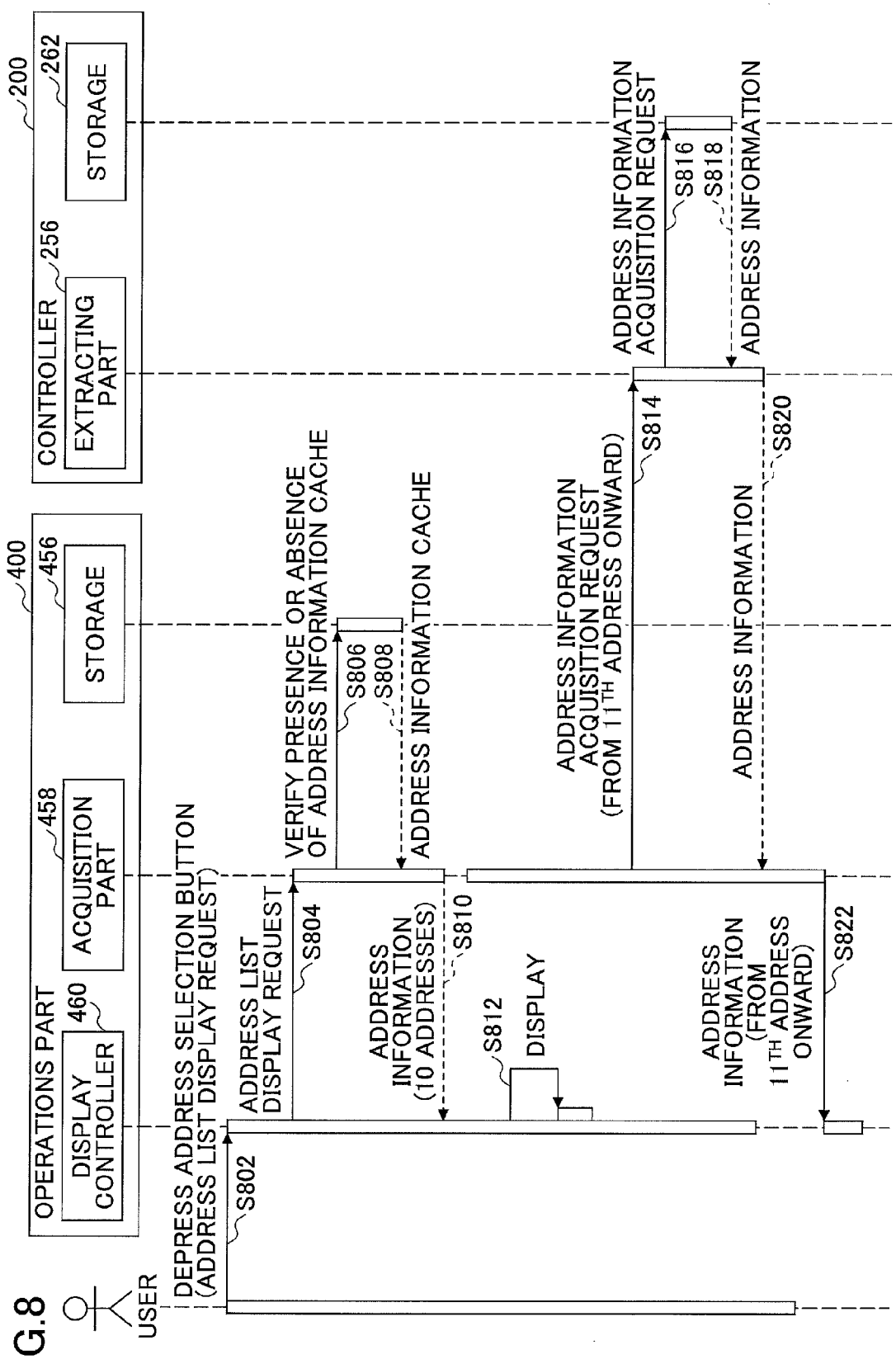
FIG. 8 is a sequence diagram illustrating operations of an image processing apparatus according to an embodiment.
Figure 9A:
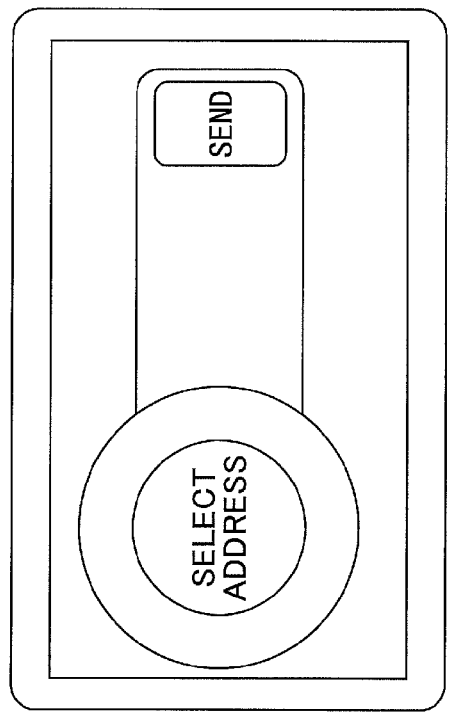
FIGS. 9A to 9C are diagrams illustrating examples of a screen displayed on an operations part of an image processing apparatus according an embodiment.
Figure 9B:
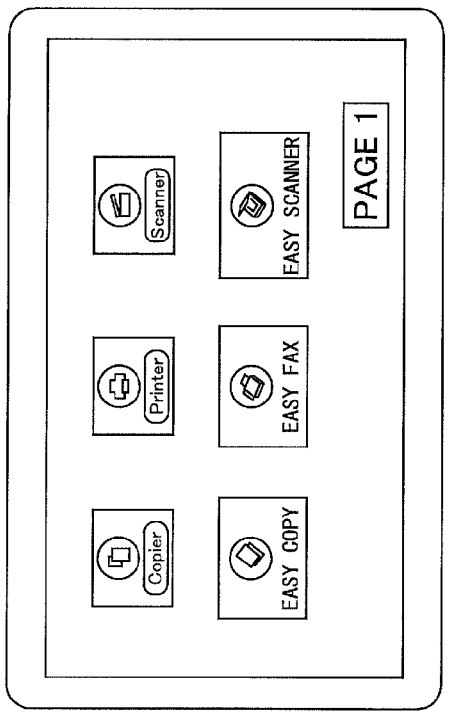
Figure 9C:
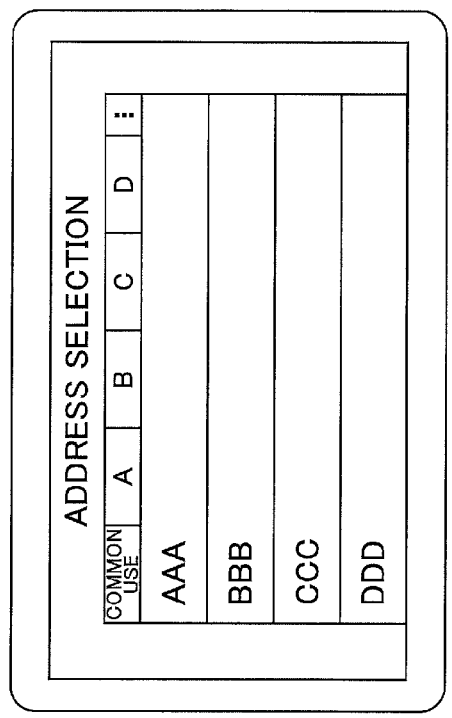

FIG. 8 is a sequence diagram illustrating operations of the image processing apparatus 100 according to the first embodiment. FIGS. 9A to 9C illustrate transition examples of a screen (user interface: UI) displayed on the display part 416 of the operations part 400.

FIG. 8 illustrates a operational process in a case where the address information is cached in the operations part 400 when the user makes a request for displaying a list of the address information. The operational process in FIG. 8 is performed after the operational process of the sequence diagram in FIG. 6 ends. In a case where the address information is cached in the operations part 400, the cached address information is displayed.

In step S802, the user operates a HOME screen displayed on the display part 416 of the operations part 400 to make a request for a process such as copying, transmitting facsimile, or scanning. FIG. 9A illustrates an example of the HOME screen. The user may be able to select a desired one of application icons displayed on the HOME screen, and depress the selected icon to activate the desired application. When the application is activated, an address selection button "SELECT ADDRESS" is displayed on the display part 416 of the operations part 400. FIG. 9B illustrates an example of a screen displaying the address selection button. The user makes a request for displaying the list of address information by depressing the address selection button displayed on the display part 416 of the operations part 400. The display controller 460 of the operations part 400 creates an address list display request when receiving the request for displaying the list of the address information.

In step S804, the display controller 460 of the operations part 400 inputs address list display request into the acquisition part 458.

In step S806, the acquisition part 458 of the operations part 400 causes the storing-reading processor 454 to verify whether the address information is cached in storage 456.

In step S808, since the address information is cached in the storage part 456, the storing-reading processor 454 of the operations part 400 transmits to the acquisition part 458 a report indicating that the address information has been cached, and inputs the cached address information. Since the acquisition part 458 has received the report indicating that the address information has been cached, the acquisition part 458 does not instruct the display controller 460 to display a message such as "Please wait . . . " illustrated FIG. 7C. Thus, the display part 416 does not display the message "Please wait . . . ".

In step S810, the acquisition part 458 of the operations part 400 inputs the address information input by the storing-reading processor 454 into the display controller 460.

In step S812, the display controller 460 of the operations part 400 inputs the address information input by the storing-reading processor 454 into the display part 416. FIG. 9C illustrates an example of the display screen of the address information in a manner similar to FIG. 7D. The user may be able to select an address by browsing the list of the address information items.

In step S814, the acquisition part 458 of the operations part 400 causes the transmitter-receiver 452 to transmit an address information acquisition request for acquiring the address information to the controller 200. The address information acquisition request specifies remaining address information items other than the address information items cached in the storage 456 among the address information items. The address information acquisition request transmitted by the operations part 400 is received by the transmitter-receiver 252 of the controller 200, and the received address information acquisition request is input into the extracting part 256.

In step S816, the extracting part 256 of the controller 200 requests the storing-reading processor 260 to acquire remaining address information items included in the address book stored in the address book management DB 264 of the storage 262 in accordance with the address information acquisition request from the operations part 400.

In step S818, the storing-reading processor 260 of the controller 200 inputs the remaining address information items included in the address book stored in the address book management DB 264 of the storage 262 into the extracting part 256.

In step S820, the extracting part 256 of the controller 200 causes the transmitter-receiver 252 to transmit the remaining address information items included in the address book input by the storing-reading processor 260 to the operations part 400. The remaining address information items included in the address book transmitted by the controller 200 are received by the transmitter-receiver 452 of the operations part 400, and the received remaining address information items are input into the acquisition part 458.

In step S822, the acquisition part 458 of the operations part 400 inputs the remaining address information items included in the address book in the display controller 460.

Thereafter, the display controller 460 of the operations part 400 may be able to display address information on the display part 416. That is, when the user who has browsed the address book displayed on the display part 416 of the operations part 400 in step S812 performs an operation to scroll a screen, the display controller 460 may be able to display the address information on the display part 416 in accordance with the operation to scroll the screen.

Figure 10B:
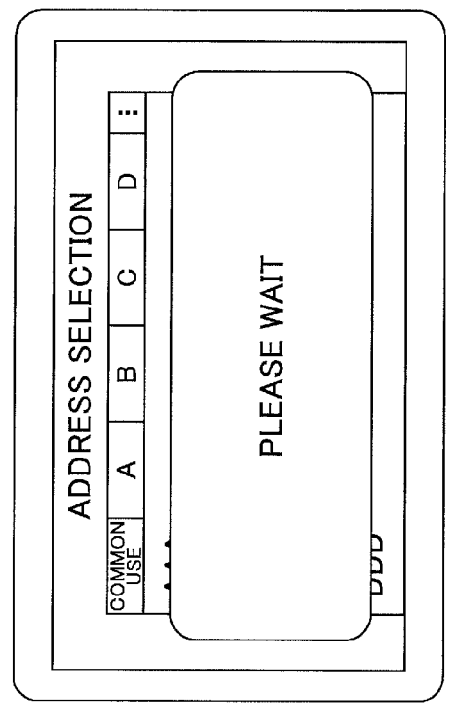
FIGS. 10A to 10C are diagrams illustrating examples of a screen displayed on an operations part of an image processing apparatus according an embodiment.
Figure 10A:
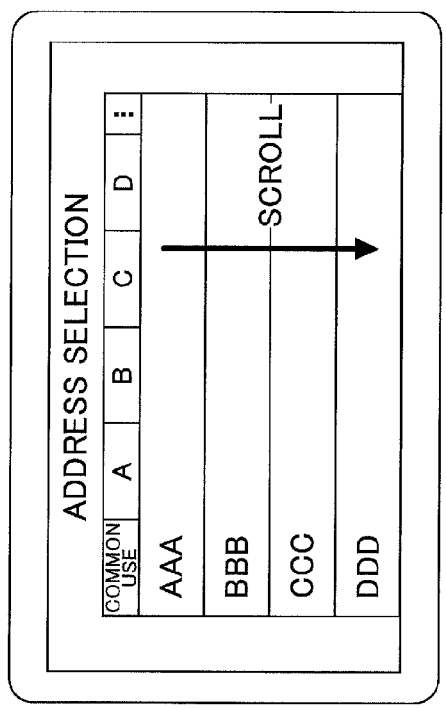
Figure 10C:
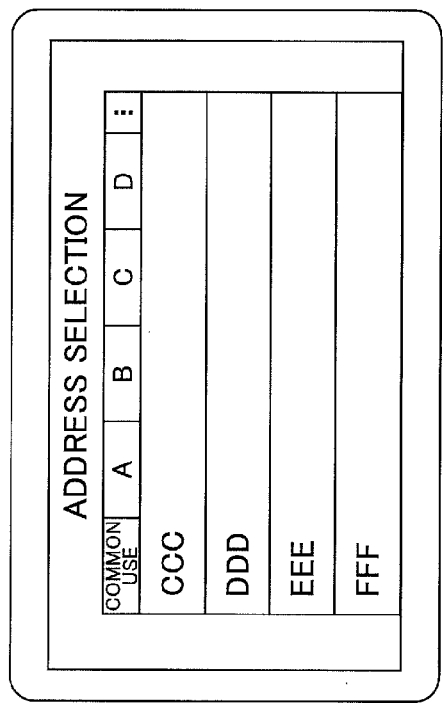

FIGS. 10A to 10C illustrate examples of a screen displayed in accordance with the operations to scroll the screen when the user performs operations to scroll the screen of the display part 416. FIGS. 10A to 10C illustrates examples of the screen (user interface: UI) displayed on the display part 416 when user performs operations to scroll the screen before the remaining address information items are acquired from the control 200 after the address information items are displayed on the display part 416 in step S812 in the sequence diagram in FIG. 8.

When the user performs operations to scroll the screen in a state where the address information is displayed on the display part 416 in step S812 (FIG. 10A) but the acquisition part 458 of the operations part 400 has not acquired the address information to be displayed in accordance with the operations to scroll the screen, the display controller 460 of the operations part 400 displays a message "Please wait . . . " on the display part 416 as illustrated in FIG. 10B. The acquisition part 458 of the operations part 400 acquires the remaining address information items in the background while the display controller 460 displays the message on the display part 416. When the acquisition part 458 of the operations part acquires the address information, the display controller 460 of the operations part 400 displays the address information on the display part 416 as illustrated in FIG. 10C.

In this embodiment, when the address information items are not cached in the operations part 400, an address information acquisition request specifying a part of the address information items may be transmitted instead of transmitting the address information acquisition request specifying the address information items.

The image processing apparatus of the first embodiment may be able to immediately display the cached address information items when a request for displaying the address information list is received via the operations part by caching in the operations part several address information items from the top among the address information items included in the address book. As a result, the time period from receiving the request for displaying the address information transmitted by the operations part to displaying the address information may be reduced. The remaining address information items may be acquired from the controller 201 in the background while displaying the cached address information. Hence, when a user who browses the address information list performs scroll operations on the screen, the remaining address information items are expected to be acquired by the operations part. Accordingly, since the address information may be displayed along with the scrolling operations on the screen, the user will not feel awkwardness.

Second Embodiment

The hardware configurations illustrated in FIGS. 1 and 2 may also be applied as examples of a configuration of an image processing apparatus 100 according to a second embodiment.

Functional Configuration of Second Embodiment

Figure 11:
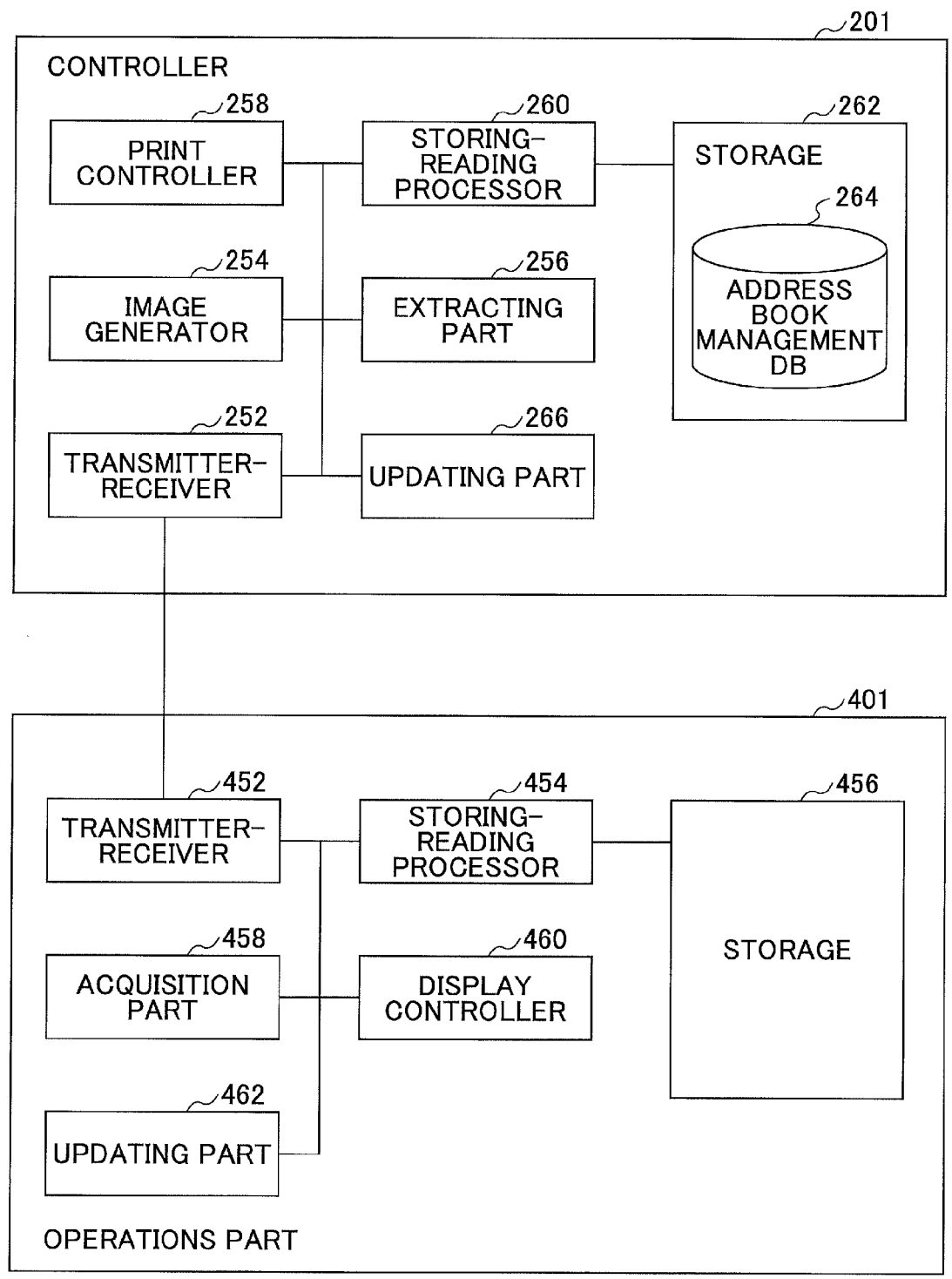
FIG. 11 is a functional block diagram illustrating an image processing apparatus according an embodiment.

Next, a description is given of functional configurations of the second embodiment. FIG. 11 is a functional block diagram illustrating a controller 201 and an operations part 401 that form the image processing apparatus 100 of the second embodiment. In FIG. 11, the controller 201 and the operations part 401 are coupled to each other via USB communications such that the controller 201 and the operations part 401 may be able to perform data communications. Note that this configuration may also be applied in a case where the controller 201 and the operations part 401 perform data communications via wireless communications.

Functional Configuration of Controller 201

The controller 201 includes a transmitter-receiver 252, an image generator 254, an extracting part 256, a print controller 258, a storing-reading processor 260, and an updating part 266. These components are functional components or functional parts implemented by causing any one of the components illustrated in FIG. 1 to operate based on instructions from the CPU 202 in accordance with the controller programs stored in the program ROM 204. Further, the controller 201 includes a storage 262 formed of the HDD 208 illustrated in FIG. 1.

The controller 201 differs from the controller 200 according to the above-described second embodiment in that the controller 201 further includes the updating part 266.

The updating part 266 receives a report by some kind of method that the address information included in the address book is to be updated, and when new address information is input, the updating part 266 replaces any of the address information items included in the address book stored in the address book management DB 264 of the storage 262 with the corresponding new address information, or adds the new address information to the address book. In addition, when the new address information corresponds to the address information cached in the operations part 401, the updating part 266 causes the transmitter-receiver 252 to report to the operations part 401 on the fact that the address information has been updated as well as transmitting the new address information.

Functional Configuration of Operations Part 401

The operations part 401 includes a transmitter-receiver 452, a storing-reading processor 454, an acquisition part 458, a display controller 460, and an updating part 462. These components are functional components or functional parts implemented by causing any of the components illustrated in FIG. 1 to operate based on instructions from the CPU 402 in accordance with the operations part programs stored in the program ROM 404. Further, the operations part 401 includes a storage 456 formed of the nonvolatile memory 412 illustrated in FIG. 1.

The operations part 401 differs from the operations part 400 according to the above-described embodiment in that the operations part 401 further includes the updating part 462.

The reports of the updated address information and the new address information are received by the transmitter-receiver 452, and input into the update part 462.

The updating part 462 causes the storing-reading processor 454 to update some of the address information items among the address information items included in the address book stored in the storage 456 corresponding to new address information items with the new address information items. As a result, in a case where the address information stored in the operations part 401 among the address information items included in the address book stored in the address book management DB 264 of the controller 201 is updated, the updated address information may be reflected to the address information stored in the storage part 456 of the operations part 401. Hence, the address information stored in the operations part 401 may be synchronized with the address information stored in the operations part 401 among the address information items included in the address book stored in the controller 201.

Operations of Image Processing Apparatus

Figure 12:
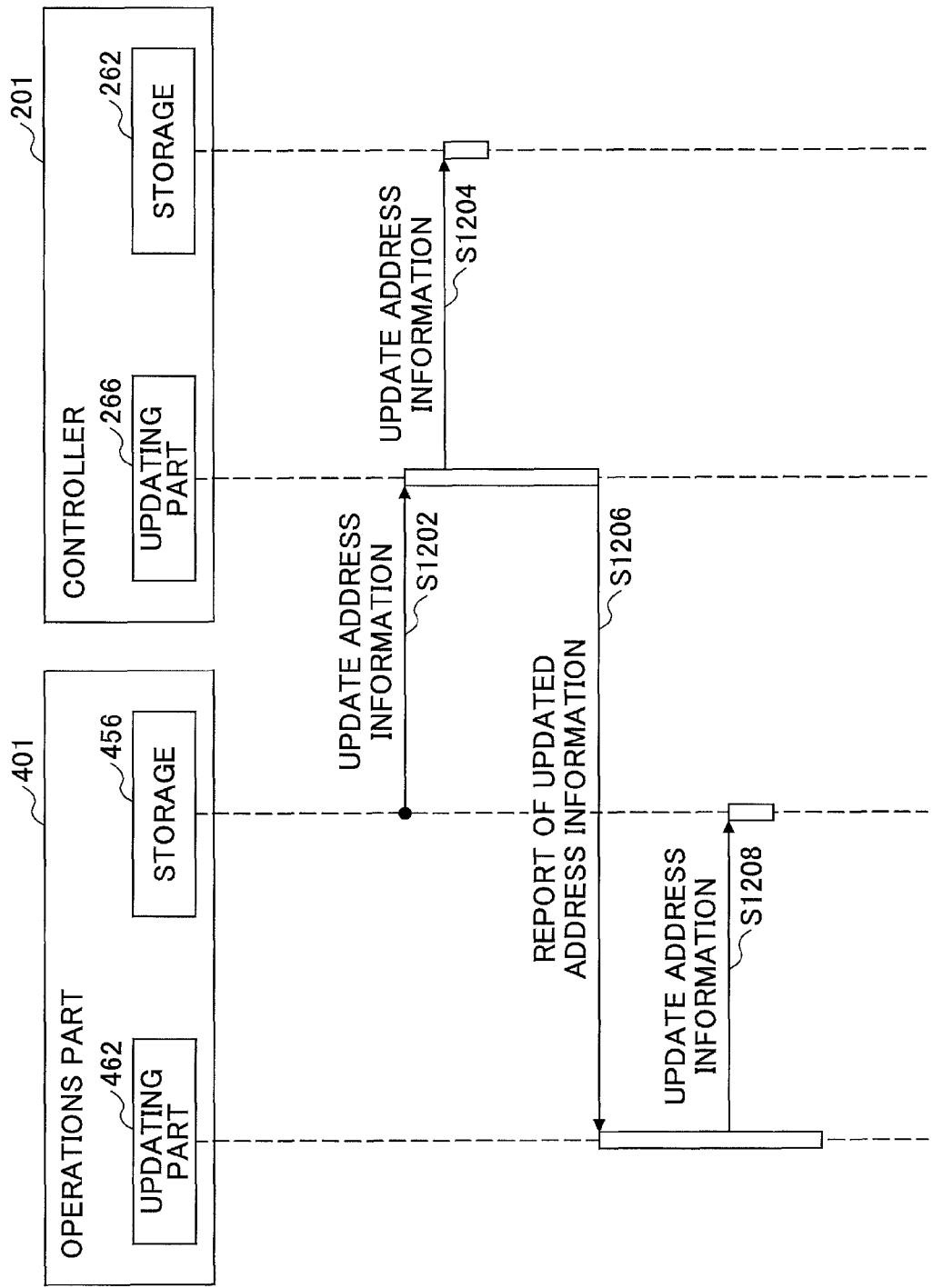
FIG. 12 is a sequence diagram illustrating operations of an image processing apparatus according to an embodiment.

FIG. 12 is a sequence diagram illustrating operations of an image processing apparatus according to the embodiment.

The sequence diagram of FIG. 12 illustrates operations of the image processing apparatus in which some of the address information items included in the address book stored in the controller 201 are changed, and the updated (changed) address information items are stored in the operations part 401. In this case, the controller sends the updated address information report and new address information to the operations part 401. The operations part 401 receives new address information transmitted by the controller 201 and updates the address information cached in the nonvolatile memory 412 with the received new address information. As a result, the address information stored in the operations part 401 may be able to be synchronized with the address information stored in the controller 201 that corresponds to the address information stored in the operations part 401. Hence, there is no difference between the address information stored in the operations part 401 and the address information stored in the controller 210.

In step S1202, new address information is input into the updating part 266 of the controller 201.

In step S1204, the updating part 266 of the controller 201 updates address information included in the address book stored in the address book management DB 264 of the storage 262 based on the new address information.

In step S1206, the updating part 266 of the controller 201 determines that the updated address information is stored in the operations part 401, and the transmitter-receiver 252 of the controller 201 transmits a report of the updated address information and the new address information to the operations part 401. The reports of the updated address information and the new address information are received by the transmitter-receiver 452 of the operations part 401, and the received updated address information and the new address information are input into the updating part 462 of the operations part 401.

In step S1208, the updating part 462 of the operations part 401 updates the address information cached in the storage 456 based on the new address information. The updating part 462 may update the address information, in a case where generation information of the stored address information differs from the generation information of the new address information, based on generation information of the address information at the time of updating the address information cached in the storage 456 with the new address information. As a result, a processing load may be reduced by omitting the update process in a case where the stored address information is the same as the new address information.

According to the embodiment of the image processing apparatus, in a case where the address information included in the address book stored in the controller 200 is updated with new address information, the address information cached in the operations part 401 may be updated based on the new address information.

In the above-described embodiment, the image processing apparatus is an example of an information processing system, the operations part is an example of a first information processing apparatus or a first information processor, and the controller is an example of a second information processing apparatus or a second information processor. Further, the address information acquisition request is an example of a first information request or a second information request, and the address information is an example of first information, second information, or third information.

According to the disclosed embodiment, the information processing system having the first and the second information processing apparatuses may be able to reduce time until displaying data stored in the first and the second information processing apparatuses.

Note that the information processing apparatus described in the above-described embodiments is an example of an information processing apparatus that includes a first information processor configured to receive an operation; and a second information processor configured to perform operations based on a request from the first information processor, where the first information processor includes an acquisition part configured to create a first information request for acquiring first information stored by the second information processor, a first transmitter configured to transmit the first information request to the second information processor, a first receiver configured to receive the first information transmitted by the second information processor, a display controller configured to display the first information, a first storage configured to store second information, the second information being a part of the first information, the acquisition part storing the second information in the first storage, the display controller controlling displaying the second information when the second information is stored in the first storage, and where the second information processor includes a second storage configured to store the first information, a second receiver configured to receive the first information request transmitted by the first information processor, an extracting part configured to extract the first information from the second storage in response to the first information request, and a second transmitter configured to transmit the first information to the first information processor.

The present invention is described with reference to the specific embodiments and modifications; however, these embodiments and modifications are merely examples. Various modifications, corrections, alterations, substitutions, and the like may be conceived by those skilled in the art. The apparatuses, devices, and components according to the embodiments and modifications are described with functional block diagrams for convenience; however, these apparatuses, devices, and components may be implemented by hardware, software, or a combination of the hardware and software. The present invention is not limited to the above-described embodiments and modifications, and may incorporate variations, alterations, corrections, substitutions, and the like without departing from the spirit of the present invention.

The present invention is not limited to the specifically disclosed embodiments, and variations and modifications may be made without departing from the scope of the present invention.

The present application is based on and claims the benefit of priority of Japanese Priority Application No. 2014-236385 filed on Nov. 21, 2014, the entire contents of which are hereby incorporated herein by reference.

What is claimed is:

1. An information processing system comprising:
a first information processing apparatus configured to receive operations; and
a second information processing apparatus configured to perform operations based on a request from the first information processing apparatus;
wherein the first information processing apparatus includes
a first memory having first computer readable instructions stored thereon; and
at least one first processor configured to execute the first computer readable instructions to,
create a first information request for acquiring first information stored by the second information processing apparatus when a second information is not stored in the first memory, the second information being a part of the first information,
transmit the first information request to the second information processing apparatus,
receive the first information transmitted by the second information processing apparatus,
display the first information on a display device, and store the second information in the first memory,
display on the display device the second information when the second information is stored in the first memory; and
wherein the second information processing apparatus includes
a second memory having second computer readable instructions stored thereon, and
at least one second processor configured to execute the second computer readable instructions to,
store the first information in the second memory,
receive the first information request transmitted by the first information processing apparatus,
extract the first information from the second memory in response to the first information request, and
transmit the first information to the first information processing apparatus.

2. The information processing system as claimed in claim 1, wherein the at least one first processor is further configured to:
create a third information request for acquiring third information, the third information being a part of the first information excluding the second information;
transmit the third information request to the second information processing apparatus;
receive the third information transmitted by the second information processing apparatus; and
display the third information on the display device; wherein
the first information is a plurality of address information items including the first information, the second information, and the third information.

3. The information processing system as claimed in claim 2, wherein the at least one first processor is further configured to:
create the third information request while the second information is being displayed.

4. The information processing system as claimed in claim 1, wherein the at least one first processor is further configured to:
determine whether the second information is stored in the first memory when receiving a request to display the first information.

5. The information processing system as claimed in claim 1, wherein the first information and the second information are address information corresponding to a first address and a second address respectively.

6. The information processing system as claimed in claim 2, wherein the third information is address information corresponding to a third address.

7. An information processing apparatus comprising:
a first information processor configured to receive an operation; and
a second information processor configured to perform operations based on a request from the first information processor;
wherein the first information processor is further configured to,
create a first information request for acquiring first information stored by the second information processor when a second information is not stored in a first memory, the second information being a part of the first information,
transmit the first information request to the second information processor,
receive the first information transmitted by the second information processor,
display the first information on a display device,
store second information in the first memory,
display the second information when the second information is stored in the first memory on the display device; and
wherein the second information processor is further configured to,
store the first information in a second memory,
receive the first information request transmitted by the first information processor,
extract the first information from the second storage in response to the first information request, and
transmit the first information to the first information processor.

8. An information processing method executed by an information processing system, the information processing method comprising:
creating, using at least one first processor included in a first information processing apparatus, a first information request for acquiring first information stored by a second information processing apparatus when a second information is not stored in a first memory, the second information being a part of the first information;
transmitting, using the at least one first processor, the first information request to the second information processing apparatus;
receiving, using the at least one first processor, the first information transmitted by the second information processing apparatus;
displaying, using the at least one first processor, the first information on a display device;
storing, using the at least one first processor, second information in the first memory;

displaying, using the at least one processor, the second information when the second information is stored at the time of the displaying the first information on the display device;

receiving, using at least one second processor included in the second information processing apparatus, the first information request transmitted by the at least one first processor;

extracting, using the at least one second processor, the first information in response to the first information request; and transmitting, using the at least one second processor, the first information to the at least one first processor.

9. The information processing system according to claim 1, wherein the at least one first processor is further configured to:

store a top ten address information items received from the at least one second processor in the first memory.

10. The information processing system according to claim 1, wherein the second memory includes an address book database; and the address book database includes a plurality of address information items, each of the address information items including at least one of address identification information, a display name, a mail address, a FAX number, circuit selection information, and generation information.

11. The information processing system according to claim 1, wherein the at least one first processor is further configured to:

determine whether the second information is stored in the first memory; and when the second information is stored in the first memory, extract the first information from the first memory.

12. The information processing system according to claim 1, wherein the first information processing apparatus is one of a smartphone, a tablet, a computer, a projector, a television-conference system, a digital camera, and an image processing apparatus.

13. The information processing method according to claim 8, wherein the first information and the second information are address information corresponding to a first address and a second address respectively.

14. The information processing method according to claim 8, further comprising:

storing, using the at least one first processor, a top ten address information items received from the at least one second processor in the first memory.

15. The information method according to claim 8, wherein the second memory includes an address book database; and the address book database includes a plurality of address information items, each of the address information items including at least one of address identification information, a display name, a mail address, a FAX number, circuit selection information, and generation information.

16. The information processing method according to claim 8, further comprising:

determining, using the at least one first processor, whether the second information is stored in the first memory; and when the second information is stored in the first memory, extracting, using the at least one first processor, the first information from the first memory.

17. The information processing method according to claim 8, wherein the first information processing apparatus is one of a smartphone, a tablet, a computer, a projector, a television-conference system, a digital camera, and an image processing apparatus.

18. The information processing apparatus according to claim 7, wherein the second memory includes an address book database; and the address book database includes a plurality of address information items, each of the address information items including at least one of address identification information, a display name, a mail address, a FAX number, circuit selection information, and generation information.

19. The information processing apparatus according to claim 7, wherein the first information processor is included in one of a smartphone, a tablet, a computer, a projector, a television-conference system, a digital camera, and an image processing apparatus.

20. The information processing apparatus according to claim 7, wherein the first information processor is further configured to:

determine whether the second information is stored in the first memory; and when the second information is stored in the first memory, extract the first information from the first memory.

* * * * *